(No Model.)
J. C. & W. N. ARRINGTON.
COMBINED PLOW AND PULVERIZER.
No. 448,770. Patented Mar. 24, 1891.
2 Sheets—Sheet 1.
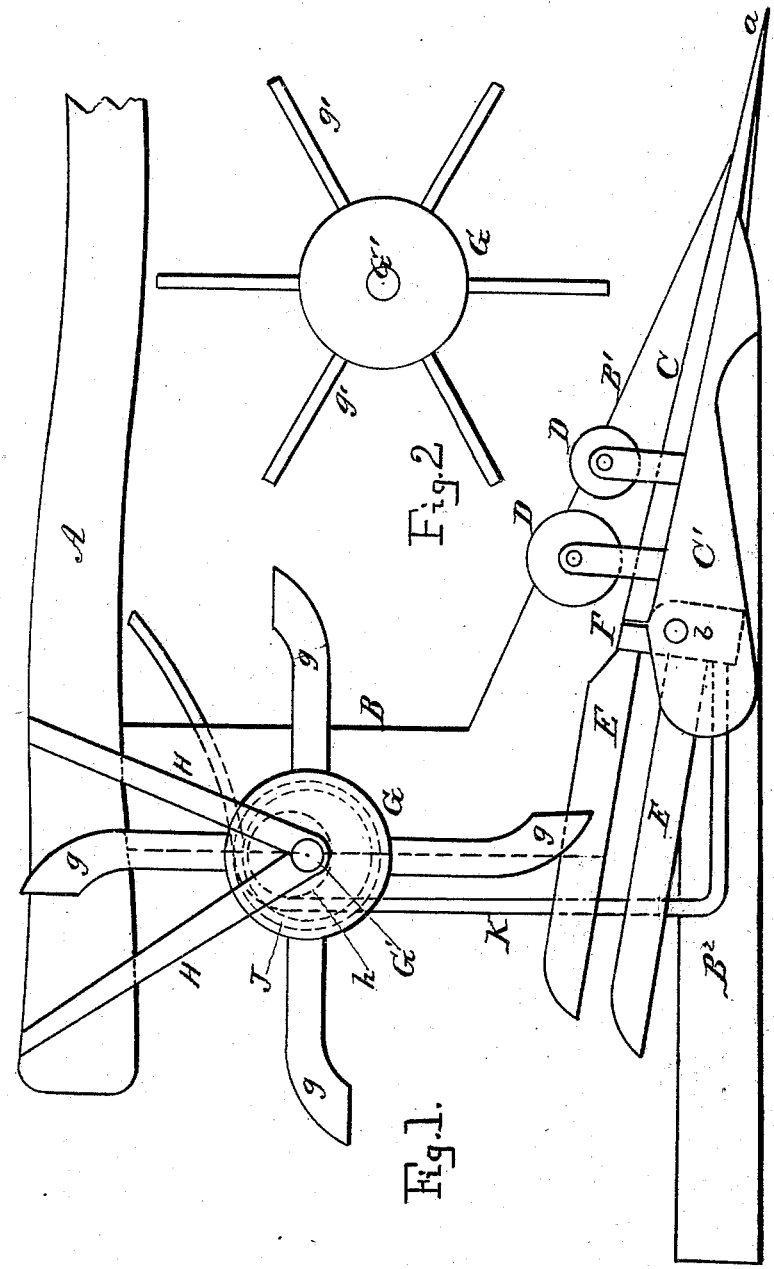
Witnesses
J. G. Calvert
Wm Gilston
Joint Inventors
James C. Arrington
By their Attorney Willis N. Arrington
C. P. Calvert

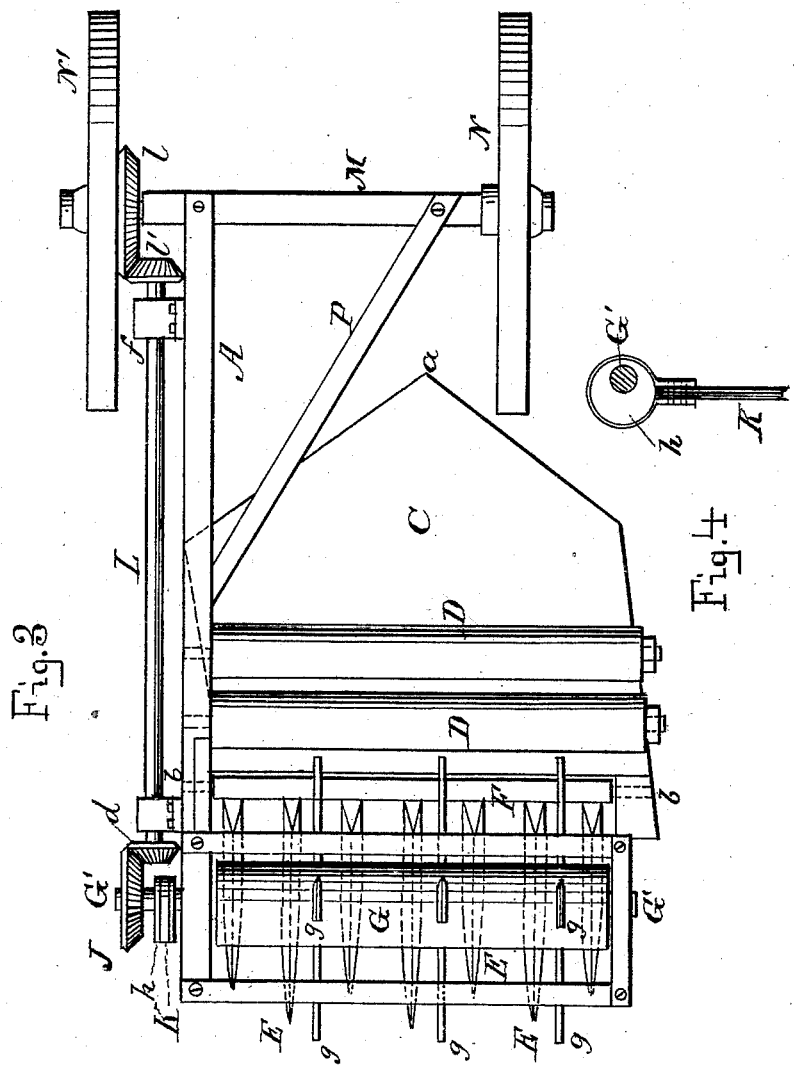

UNITED STATES PATENT OFFICE.

JAMES C. ARRINGTON AND WILLIS N. ARRINGTON, OF TISHOMINGO, ASSIGNOR OF ONE-HALF TO CLEMENT A. HANCOCK, OF CADDO, INDIAN TERRITORY.

COMBINED PLOW AND PULVERIZER.

SPECIFICATION forming part of Letters Patent No. 448,770, dated March 24, 1891.

Application filed October 2, 1890. Serial No. 366,903. (No model.)

*To all whom it may concern:*

Be it known that we, JAMES C. ARRINGTON and WILLIS N. ARRINGTON, citizens of the United States, residing at Tishomingo, in the county of Chickasaw, Indian Territory, have invented certain new and useful Improvements in a Combined Plow and Pulverizer; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to certain novel and valuable improvements in implements which are designed for plowing the surface soil and disintegrating clods, leaving the soil finely pulverized, which improvements will be fully understood from the following description and claims, taken in connection with the annexed drawings, in which—

Figure 1 is an elevation of the improved implement, as seen from the furrow side, the driving-gear being omitted. Fig. 2 is an end view showing a modification of the rotary knife-drum. Fig. 3 is a top view of the improved implement complete; and Fig. 4 is a detail of the eccentric G' and a portion of the rod which gives vibration to the pulverizing-knives E.

Similar letters of reference indicate corresponding parts in the several views.

Referring to the annexed drawings by letter, A designates the draft-beam of the improved implement, and B the rigid standard, to which latter is applied a front colter B', a landside-bar B², and an inclined shovel or plow-blade C, which latter inclines forward and is tapered to form a point $a$. On the furrow side of the inclined shovel C is a bar or shoe C', to the rear extended portion of which the outer end of a rocking bar F is pivoted at $b$, the inner end of this bar being pivoted to the standard on landside-plate at $b$, as shown in Fig. 3. To this rocking bar F are rigidly but removably secured two rows of cutting-blades E, which extend backward and may have curved or straight cutting-edges. Above these vibrating blades are several series of cutting-blades $g$, which are suitably secured into a drum G, which is secured upon a horizontal shaft G', journaled in the standard B, and also in an overhanging frame H. The rotary knives $g$ are so arranged relatively to the vibrating knives E that during the rotation of the former they pass between the latter and rapidly pulverize the soil as it passes back from the shovel C upon and between the vibrating knives.

In front of the rocking bar F, and arranged over the surface of the shovel C, are rollers D, which not only act as clod-crushers, but they also materially aid in feeding the earth from the rear end of said shovel upon the knives E.

On the landside end of the drum-shaft G' are keyed a beveled cog-wheel J and eccentric $h$, which latter transmits vibration to the bar F through the medium of a pitman-rod K. The beveled cog-wheel J engages with a pinion $d$, keyed on a longitudinal shaft L, which is journaled in boxes $f$ on the landside of the draft-bar A. The front end of the shaft L has keyed on it a pinion beveled wheel $i'$, which gears with a beveled wheel $l$, fastened on the inner side of the transporting and driving wheel N'. This wheel and its fellow are on a short axle M, secured to the beam A and held rigid thereto by a diagonal brace P. It will thus be seen that as the machine advances rotative motion will be transmitted to the knife-bearing drum G. At the same time vibrating motion will be transmitted to the knives E, thereby crushing and cutting clods, weeds, &c., and leaving the soil loose and finely pulverized.

In the practical working of our machine we shall key on the shaft G a balance-wheel of suitable bearing to overcome dead-centers, and by its maintenance to freely cut and disintegrate the clods, &c.

Having thus described our invention, what we claim as new, and desire to secure by Letters Patent, is—

1. A combined shovel-plow and soil-pulverizer comprising a draft-beam, a standard, an inclined shovel-plow, vibrating knives, and rotary knives, all arranged and adapted to operate substantially in the manner and for the purpose specified.

2. In a combined shovel-plow and soil-pulverizer, the combination of a forwardly-inclined flat shovel, feeding and crushing rollers arranged over the same, the vibrating knives and rotary knives, operated by means substantially as described.

In testimony whereof we affix our signatures in presence of two witnesses.

JAMES C. ARRINGTON.
WILLIS N. ARRINGTON.

Witnesses:
T. J. SMITH,
T. A. BIRD.